(12) United States Patent
Tsuruta et al.

(10) Patent No.: US 10,014,507 B2
(45) Date of Patent: Jul. 3, 2018

(54) ENERGY STORAGE APPARATUS

(71) Applicant: GS Yuasa International Ltd., Kyoto-shi (JP)

(72) Inventors: Shogo Tsuruta, Kyoto (JP); Yuichiro Yamamoto, Kyoto (JP); Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 46 days.

(21) Appl. No.: 14/806,509

(22) Filed: Jul. 22, 2015

(65) Prior Publication Data

US 2016/0036028 A1    Feb. 4, 2016

(30) Foreign Application Priority Data

Jul. 31, 2014    (JP) ................... 2014-157058

(51) Int. Cl.
| | |
|---|---|
| *H01M 2/20* | (2006.01) |
| *H01M 10/04* | (2006.01) |
| *H01G 11/00* | (2013.01) |
| *H01M 2/10* | (2006.01) |

(52) U.S. Cl.
CPC ............ *H01M 2/204* (2013.01); *H01G 11/00* (2013.01); *H01M 2/1016* (2013.01); *H01M 2/202* (2013.01); *H01M 10/0468* (2013.01); *H01M 10/0481* (2013.01); *H01M 2/206* (2013.01)

(58) Field of Classification Search
CPC .. H01M 2/204; H01M 10/0468; H01M 2/206; H01M 2/1016; H01M 2/202; H01M 10/0481; H01G 11/00

USPC .......................................... 429/121; 29/623.1
See application file for complete search history.

(56) References Cited

U.S. PATENT DOCUMENTS

| | | | |
|---|---|---|---|
| 2010/0047686 A1 | 2/2010 | Tsuchiya et al. | |
| 2011/0097620 A1* | 4/2011 | Kim .................... | H01M 2/1061 429/161 |
| 2012/0264001 A1 | 10/2012 | Tsuchiya et al. | |
| 2012/0264003 A1 | 10/2012 | Tsuchiya et al. | |
| 2012/0264004 A1 | 10/2012 | Tsuchiya et al. | |
| 2012/0264005 A1 | 10/2012 | Tsuchiya et al. | |
| 2012/0264006 A1 | 10/2012 | Tsuchiya et al. | |

(Continued)

FOREIGN PATENT DOCUMENTS

| | | | |
|---|---|---|---|
| JP | H 11-086832 A | 3/1999 | |
| JP | 2009-289428 A | 12/2009 | |

(Continued)

*Primary Examiner* — Mark F. Huff
*Assistant Examiner* — Omar M Kekia
(74) *Attorney, Agent, or Firm* — McGinn IP Law Group, PLLC.

(57) ABSTRACT

An energy storage apparatus provided with a plurality of energy storage devices arranged in a row in a first direction. The energy storage apparatus includes: a bus bar connected to electrode terminals of at least two energy storage devices out of the plurality of energy storage devices; and a bus bar frame including a pressing portion that is brought into contact with the bus bar from a side opposite to the plurality of energy storage devices. The bus bar frame includes a first restriction portion with which a first member other than the bus bar frame is engaged such that a movement of the restriction portion toward the side opposite to the plurality of energy storage devices is restricted.

14 Claims, 12 Drawing Sheets

(56) References Cited

U.S. PATENT DOCUMENTS

2013/0149582 A1* 6/2013 Kimura ................ H01M 10/50
429/120
2013/0309539 A1* 11/2013 Yoshioka ............... H01G 11/52
429/99
2015/0064523 A1* 3/2015 Lim .................... H01M 10/647
429/82

FOREIGN PATENT DOCUMENTS

| JP | 2011-066012 A | 3/2011 |
| JP | 2013-161681 A | 8/2013 |

* cited by examiner

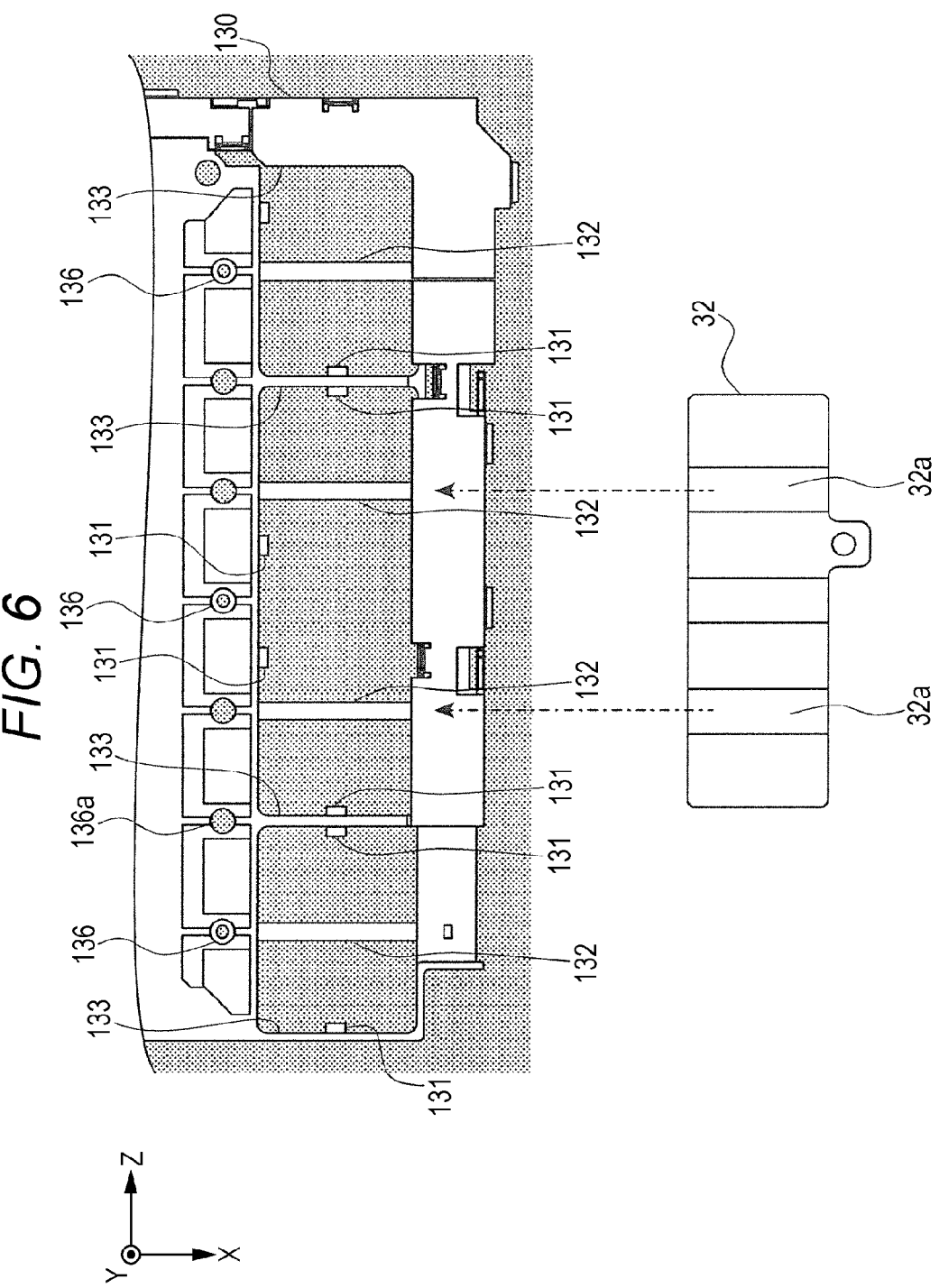

ize Storage Apparatus

ENERGY STORAGE APPARATUS

CROSS-REFERENCE TO RELATED APPLICATIONS

This application claims the benefit of Japanese patent application No. 2014-157058, filed on Jul. 31, 2014, which is incorporated by reference.

FIELD

The present invention relates to an energy storage apparatus provided with a plurality of energy storage devices.

BACKGROUND

Conventionally, there has been known an energy storage apparatus which is used for an electric power storage or is used as a power source, and includes a plurality of energy storage devices. In such an energy storage apparatus, the energy storage devices arranged adjacently are electrically connected to each other by a metal-made member referred to as a bus bar.

JP-A-2011-066012 discloses a battery apparatus provided with a plurality of battery modules in which a bus bar can be easily mounted on electrodes by temporarily fixing bolts to metal terminals of the battery modules.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus provided with a plurality of energy storage devices in which a bus bar is easily joined to electrode terminals of the energy storage devices.

According to an aspect of the present invention, there is provided an energy storage apparatus including: a plurality of energy storage devices arranged in a row in a first direction; a bus bar connected to electrode terminals of at least two energy storage devices out of the plurality of energy storage devices; and a bus bar frame including a pressing portion that is brought into contact with the bus bar from a side opposite to the plurality of energy storage devices, wherein the bus bar frame includes a restriction portion with which a first member other than the bus bar frame is engaged such that a movement of the restriction portion toward the side opposite to the plurality of energy storage devices is restricted.

BRIEF DESCRIPTION OF DRAWINGS

The foregoing and other features of the present invention will become apparent from the following description and drawings of an illustrative embodiment of the invention in which:

FIG. 6 is a plan view showing the schematic configuration of the bus bar frame according to the embodiment.

DESCRIPTION OF EMBODIMENTS

Figure 1:
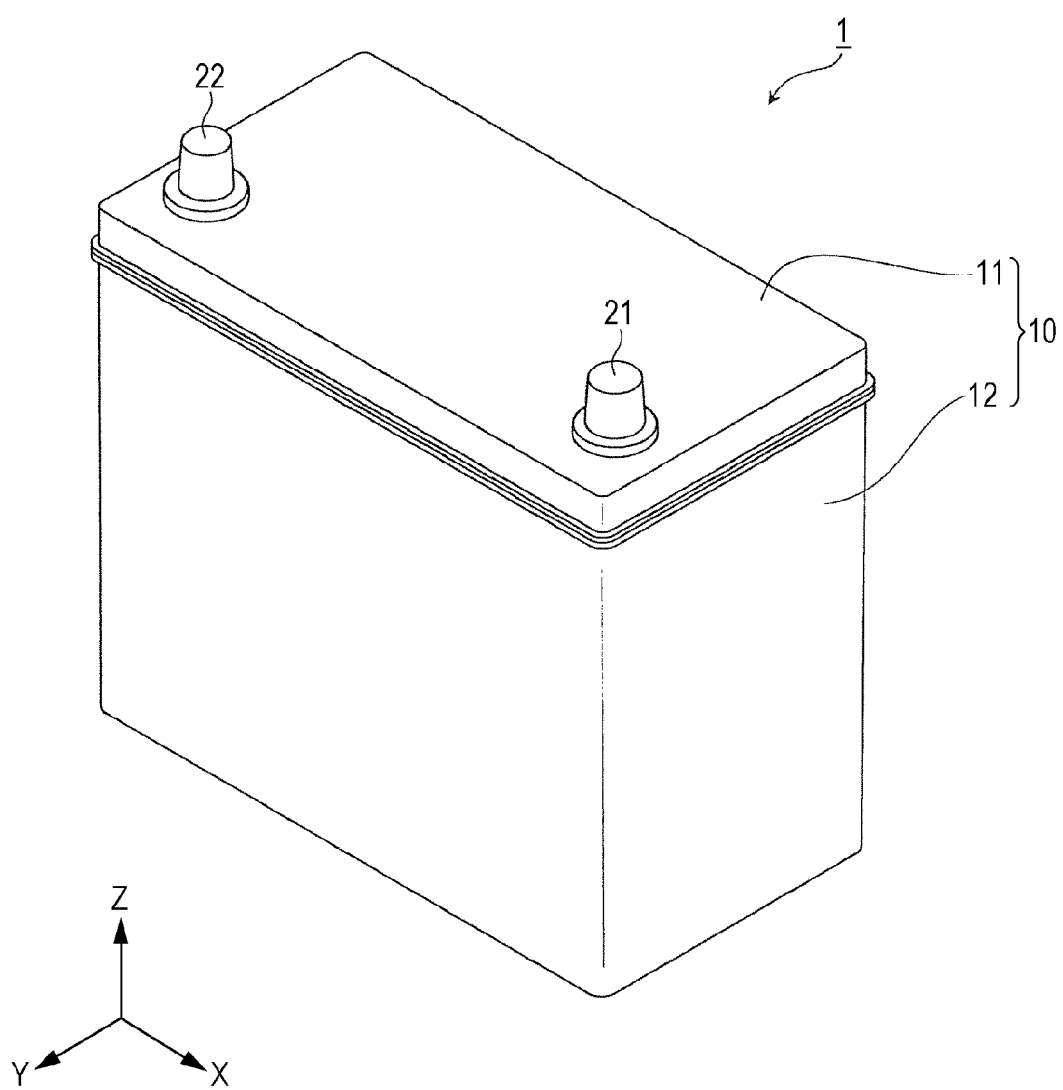
FIG. 1 is a perspective view showing an external appearance of an energy storage apparatus according to an embodiment.

According to an aspect of the present invention, there is provided an energy storage apparatus including: a plurality of energy storage devices arranged in a row in a first direction; a bus bar connected to electrode terminals of at least two energy storage devices out of the plurality of energy storage devices; and a bus bar frame including a pressing portion that is brought into contact with the bus bar from a side opposite to the plurality of energy storage devices, wherein the bus bar frame includes a restriction portion with which a movement of the restriction portion toward the side opposite to the plurality of energy storage devices is restricted.

With such a configuration, in the energy storage apparatus provided with the plurality of energy storage devices, the pressing portion of the bus bar is brought into contact with the bus bar which electrically connects at least two energy storage devices to each other so as to press the bus bar in the direction toward the plurality of energy storage devices. Further, the movement of the restriction portion of the bus bar frame toward a side opposite to the plurality of energy storage devices is restricted and, as a result, the movement of the bus bar frame in the same direction is restricted.

That is, the bus bar frame acts on the bus bar so as to bring the bus bar into pressure contact with respective electrode terminals of at least two energy storage devices to be joined to the bus bar at the time of manufacturing the energy storage device. Accordingly, the bus bar can be maintained in a normal posture at a normal position by the bus bar frame. Further, the joining operation of the bus bar 32 (laser welding or the like) can be performed with high accuracy.

The bus bar frame is a member structurally associated with the bus bar. For example, the bus bar frame may be configured to provide the insulation between plural bus bars or the insulation between the bus bar and other metal members. That is, the bus bar frame of this aspect of the present invention can be realized by giving a role of restricting a position of the bus bar to a member having different usage such as the above-described insulation. In this case, it is unnecessary to prepare a dedicated part for restricting the position of the bus bar. Accordingly, this configuration is advantageous from a viewpoint of the simplifying the structure of the energy storage apparatus, enhancing production efficiency of the energy storage apparatus or the like, for example.

According to the energy storage apparatus of this aspect of the present invention, it is possible to provide an energy storage apparatus in which a bus bar can be easily joined to the electrode terminals of the energy storage devices.

In the energy storage, the restriction portion may include: a first restriction portion whose movement is restricted by the first member; and a second restricting member whose movement is restricted by the first member a second member other than the bus bar frame, and the first restriction portion and the second restriction portion may be arranged in a second direction intersecting with the first direction, and may be arranged on opposite sides while sandwiching the bus bar therebetween.

With such a configuration, the movement of the first restriction portion and the second restriction portion which are arranged with the bus bar sandwiched therebetween is restricted and hence, the bus bar frame is made to press the bus bar in a well balanced manner. Accordingly, it is possible to restrict the position of the bus bar in a more stable manner and with high accuracy at the time of joining the bus bars to the electrode terminals of the energy storage device.

In the energy storage apparatus, the first restriction portion may be positioned on an end of the energy storage device in the second direction, and the second restriction portion may be positioned on a surface of the energy storage device where the electrode terminals are arranged.

With such a configuration, the bus bar frame is made to press the bus bar in a well-balanced manner by effectively making use of a space formed around a plurality of energy storage devices in the energy storage apparatus.

In the energy storage apparatus, a pair of the first restriction portion and the second restriction portion may be arranged in plural on the bus bar frame in the first direction.

With such a configuration, the position of the bus bar frame is restricted in a well-balanced manner in the direction along which the plurality of energy storage devices are arranged (the first direction) and hence, the stability in position of the bus bar frame with respect to the plurality of energy storage devices is enhanced. As a result, the bus bar frame can be made to press the plurality of bus bars arranged in the first direction in a stable manner.

The energy storage apparatus may further include a first spacer arranged between the two energy storage devices arranged adjacently to each other, and the movement of the restriction portion may be restricted by the first spacer which forms the first member.

With such a configuration, the first spacer is made to restrict a position of the bus bar frame, and the first spacer can be arranged on any one of the plurality of energy storage devices provided that the first spacer is arranged between two energy storage devices arranged adjacently to each other. Accordingly, it is unnecessary to prepare a dedicated part for restricting the position of the bus bar frame and hence, the degree of freedom in position of a portion for restricting the position of the bus bar frame is enhanced.

By providing portions which are engaged with the first restriction portion and the second restriction portion respectively to the first spacer, the structure for restricting the position of the bus bar frame in a stable manner can be simplified.

The energy storage apparatus may further include a restraining member which applies a restraining force in the first direction to the plurality of energy storage devices, wherein the restriction portion may be configured such that the movement of the restriction portion is restricted by being engaged with a first projecting portion which the first member has, and the restraining member may be configured such that the movement of the restraining member toward a side opposite to the restraining member with the first projecting portion sandwiched therebetween is restricted by being brought into contact with the first projecting portion.

With such a configuration, the restriction portion of the bus bar frame is engaged with the first projecting portion, and the first projecting portion can restrict a position of the restraining member. That is, the first projecting portion functions as a portion for restricting the positions of both the bus bar frame and the restraining member. With such a configuration, a high-quality energy storage apparatus into which members such as a bus bar are assembled with high accuracy can be realized with a simple configuration.

The energy storage apparatus may further include a first spacer arranged between the two energy storage devices arranged adjacently to each other, forms the first member, and includes the first projecting portion.

With such a configuration, the first spacer arranged between two energy storage devices includes the first projecting portion. Accordingly, for example, it is unnecessary to prepare a dedicated part for restricting the positions of the bus bar frame and the restraining member and hence, the degree of freedom in the position of the portion for restricting the positions of the bus bar frame and the restraining member is increased.

The energy storage apparatus may further include a second spacer arranged adjacently to the first spacer in a state where one energy storage device out of the at least two energy storage devices is sandwiched between the first spacer and the second spacer, wherein the second spacer may have a second projecting portion arranged at a position where the second spacer is arranged in a row with the first projecting portion of the first spacer in the first direction and is engaged with the first projecting portion.

With such a configuration, the first projecting portion and the second projecting portion which are arranged in a row in the first direction function at least as portions for restricting relative positions of the first spacer and the second spacer, and positions of the bus bar frame and the restraining member. That is, it is possible to realize the restriction of relative positions of the plurality of members which the energy storage apparatus includes with a simple configuration.

According to the aspects of the present invention, it is possible to provide an energy storage apparatus in which a bus bar can be easily joined to electrode terminals of energy storage devices.

Hereinafter, an energy storage apparatus according to an embodiment of the present invention is described by reference to drawings. The respective drawings are provided for describing energy storage apparatuses according to the embodiments and modifications, and components are not always described strictly accurately.

Numerical values, shapes, materials, components, arrangement positions of the components, connection states, manufacturing steps, the order of the manufacturing steps and the like described in the following embodiments merely show one example, and these are not described with the intension of limiting the present invention. Among components in the embodiment described hereinafter, components which are not described in independent claims that express uppermost concepts are described as arbitrary or optional elements.

Embodiment

Firstly, the schematic configuration of an energy storage apparatus 1 is described by reference to FIG. 1 and FIG. 2.

Figure 2:
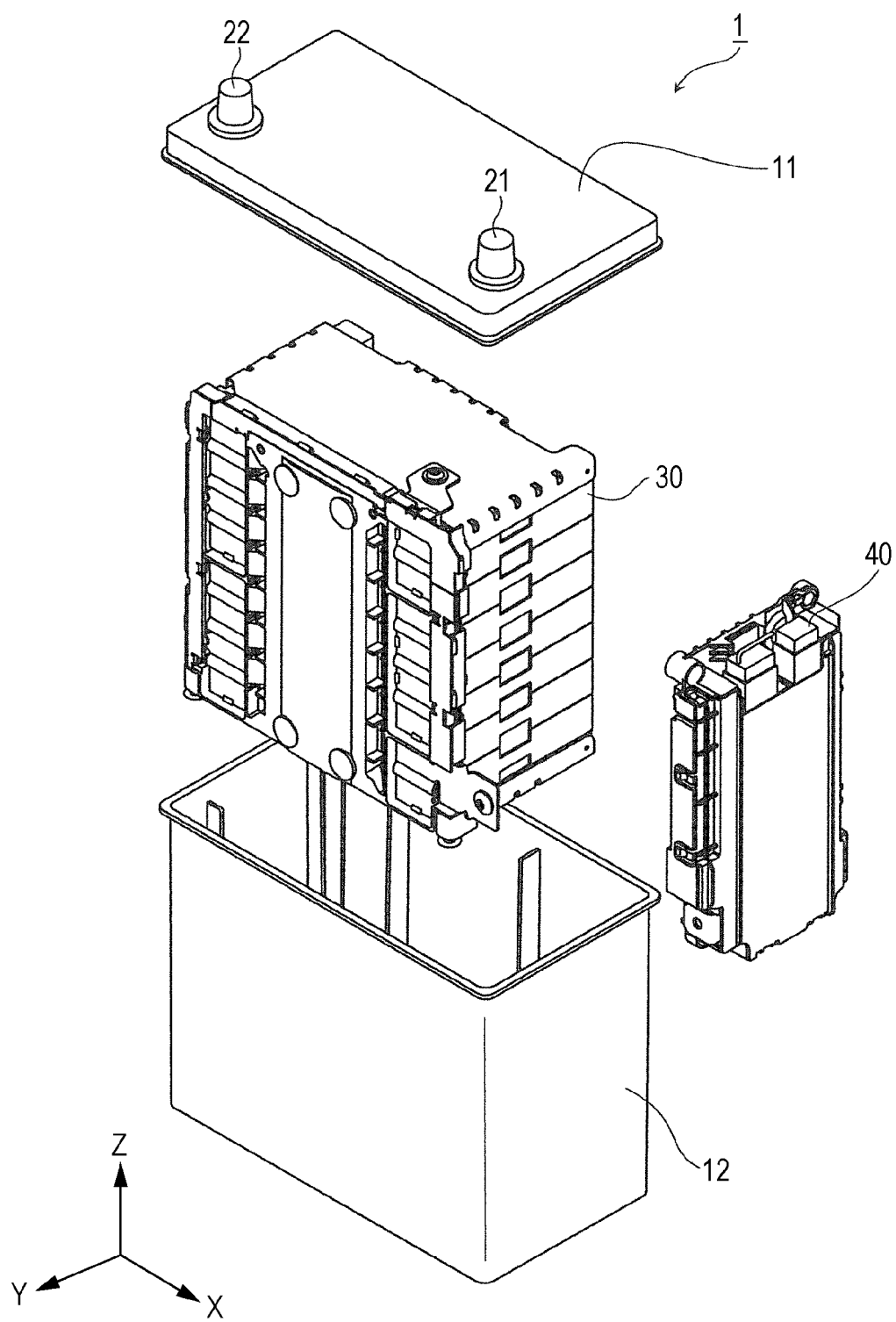
FIG. 2 is an exploded perspective view showing respective constitutional elements of the energy storage apparatus according to the embodiment in an exploded manner.

FIG. 1 is a perspective view showing an external appearance of the energy storage apparatus 1 according to the embodiment. FIG. 2 is an exploded perspective view showing respective components of the energy storage apparatus 1.

In these drawings, a Z axis direction is indicated as a vertical direction and hence, the description is made by assuming the Z axis direction as the vertical direction. However, there may be a case where the Z axis direction does not become the vertical direction depending on a mode of use of the energy storage apparatus. Accordingly, the Z axis direction is not limited to the vertical direction.

The energy storage apparatus 1 is an apparatus which can store electricity supplied from the outside therein and can discharge electricity to the outside. For example, the energy storage apparatus 1 is a battery module which is used for an electric power storage or is used as a power source.

As shown in these drawings, the energy storage apparatus 1 includes an outer package body 10 constituted of a first outer package body 11 and a second outer package body 12, and an energy storage unit 30 and electric equipment 40 which are housed in the inside of the outer package body 10.

The outer package body 10 is a rectangular-shaped (box-shaped) container (module case) which is arranged outside the energy storage unit 30 and the electric equipment 40 and forms an outer package body of the energy storage apparatus 1. That is, the energy storage unit 30 and the electric equipment 40 are arranged at predetermined positions in the outer package body 10 so that the outer package body 10 protects the energy storage unit 30 and the electric equipment 40 from an impact or the like.

The outer package body 10 is made of an insulating resin such as polycarbonate, polypropylene (PP) or the like, for example, and the outer package body 10 prevents the energy storage unit 30 and the electric equipment 40 from being brought into contact with an external metal member and the like.

The outer package body 10 includes: the first outer package body 11 which forms a lid body of the outer package body 10; and the second outer package body 12 which forms a main body of the outer package body 10. The first outer package body 11 is a flat rectangular-shaped cover member which closes an opening of the second outer package body 12, and a positive electrode external terminal 21 and a negative electrode external terminal 22 are mounted on the first outer package body 11. The energy storage apparatus 1 stores electricity charged from the outside and discharges electricity to the outside via the positive electrode external terminal 21 and the negative electrode external terminal 22. The second outer package body 12 is a bottomed rectangular cylindrical housing having an opening, and the second outer package body 12 houses the energy storage unit 30 and the electric equipment 40 therein.

The energy storage unit 30 includes one or more energy storage devices 100, and the energy storage devices 100 are connected to the positive electrode external terminal 21 and the negative electrode external terminal 22 mounted on the first outer package body 11. In this embodiment, as shown in FIG. 2, the energy storage unit 30 is arranged in the inside of the second outer package body 12 in a state where the plurality of energy storage devices 100 are stacked on each other in the Z axis direction in a horizontally placed manner. The energy storage unit 30 is housed in the inside of the outer package body 10 in a state where the energy storage unit 30 is covered with the first outer package body 11 from above. The detailed configuration of the energy storage unit 30 is described later by reference to FIG. 3 and the like.

The electric equipment 40 is rectangular equipment in which a printed circuit board, relays and the like are arranged. The electric equipment 40 is arranged on one side (a plus side in the X axis direction) of the energy storage unit 30. In this embodiment, as shown in FIG. 2, the electric equipment 40 is arranged in the inside of the second outer package body 12 in an upright posture in the Z axis direction in a state where the printed circuit board is vertically arranged. Further, the electric equipment 40 is housed in the inside of the outer package body 10 while being covered by the first outer package body 11 from above.

The printed circuit board provided to the electric equipment 40 is connected to positive electrode terminals and negative electrode terminals of the respective energy storage devices 100 disposed in the energy storage unit 30 by lines (lead lines) not shown in the drawing, and obtains, monitors and controls a charging state, a discharging state and the like (a battery state such as a voltage, a temperature) of each energy storage device 100, for example.

Next, the configuration of the energy storage unit 30 is described in detail by reference to FIG. 3 to FIG. 9B.

Figure 3:
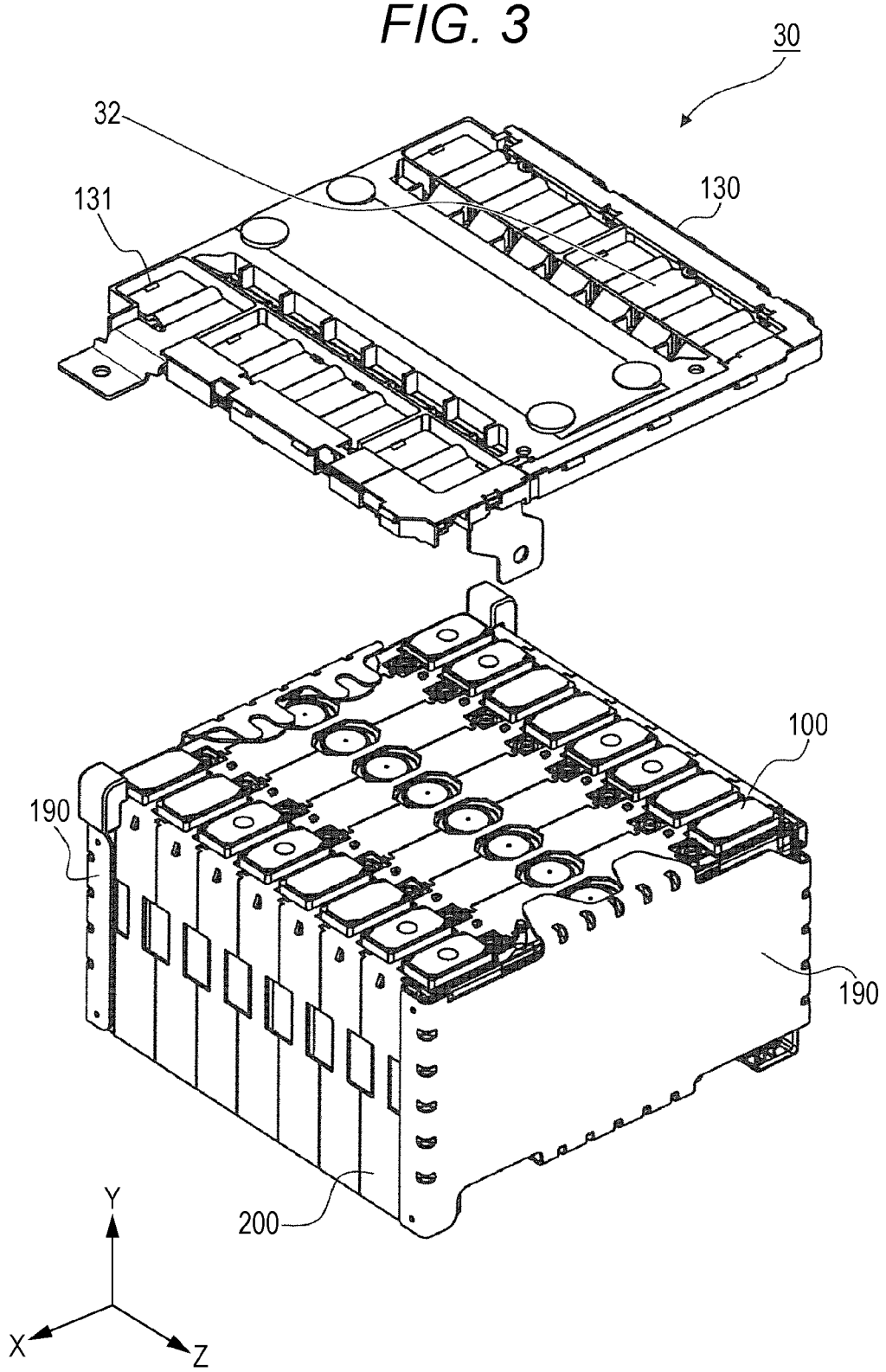
FIG. 3 is a first perspective view showing the configuration of an energy storage unit according to the embodiment.

FIG. 3 is a first perspective view showing the configuration of the energy storage unit 30 according to the embodiment. To be more specific, FIG. 3 is an exploded perspective view of the energy storage unit 30 as viewed from an oblique upper position in a state where a plurality of energy storage devices 100 and a bus bar frame 130 are separated from each other.

Figure 4:
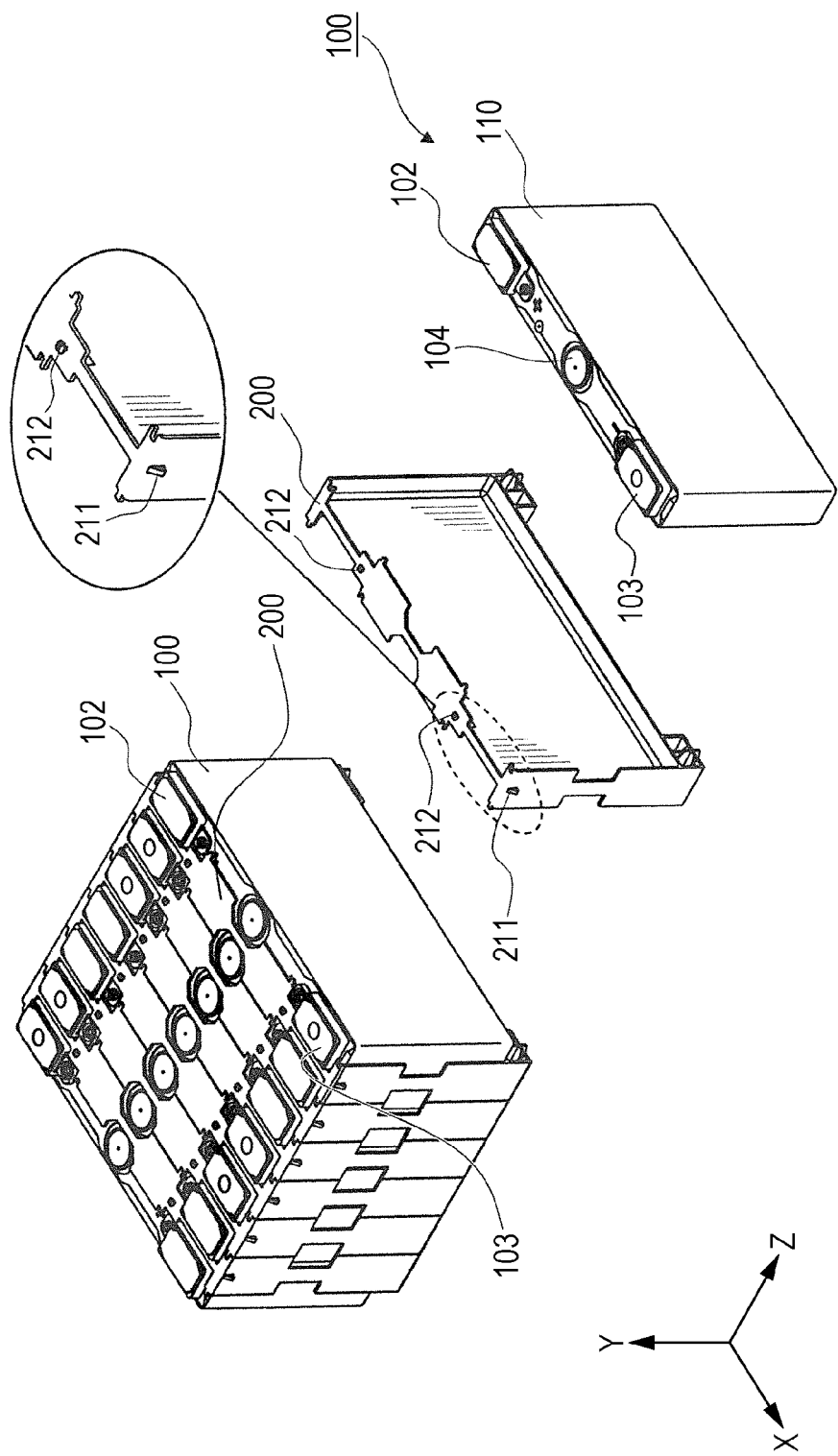
FIG. 4 is a perspective view showing the schematic configuration of the energy storage device and a spacer according to the embodiment.

FIG. 4 is a perspective view showing the schematic configuration of the energy storage devices 100 and spacers 200 according to the embodiment. To be more specific, FIG. 4 is an exploded perspective view showing a plurality of energy storage devices 100 and a plurality of spacers 200 which are arranged in a row in the Z axis direction in a state where some energy storage devices 100 and some spacers 200 are separated from other energy storage devices 100 and other spacers 200.

In FIG. 3, FIG. 4 and drawings succeeding to FIG. 4, for the sake of convenience of the description, a Y axis direction is expressed as the vertical direction. To be more specific, a plus side in the Y axis direction is expressed as an upward direction, and a minus side in the Y axis direction is expressed as a downward direction. However, in an actual mode of use, the Y axis direction does not always take the vertical direction. The same goes for a modification of the embodiment described later.

As shown in FIG. 3, the energy storage unit 30 includes a plurality of energy storage devices 100 (eight energy storage devices 100 in this embodiment) and the bus bar frame 130.

As shown in FIG. 4, the plurality of energy storage devices 100 are arranged in a row in the first direction (in the Z axis direction in this embodiment), and the spacer 200 is arranged between each two energy storage devices 100 arranged adjacently to each other. That is, in this embodiment, seven spacers 200 are arranged with respect to eight energy storage devices 100 arranged in a row in the Z axis direction.

The plurality of energy storage devices 100 are held by a pair of sandwiching members 190 in a state where the plurality of energy storage devices 100 are sandwiched between the pair of sandwiching members 190 from both sides in the arrangement direction (in the Z axis direction) thereof. The sandwiching member 190 is a member made of metal such as stainless steel or aluminum, for example. By arranging an insulating member between the sandwiching member 190 and the energy storage device 100 arranged adjacently to the sandwiching member 190, the insulation between the sandwiching member 190 and the energy storage device 100 is secured.

Although a restraining force generated by one or more restraining members is applied to the plurality of energy storage devices 100 by way of the pair of sandwiching members 190, for the sake of convenience of the description, the illustration and the detailed description of the restraining members are omitted.

The energy storage device 100 is a secondary battery (battery) which can store electricity therein and discharge electricity therefrom. To be more specific, the energy storage device 100 is a nonaqueous electrolyte secondary battery such as a lithium ion secondary battery. The energy storage device 100 has a flat rectangular shape, and is arranged adjacently to at least one spacer 200.

The energy storage device 100 is not limited to the nonaqueous electrolyte secondary battery, and may be a secondary battery other than the nonaqueous electrolyte secondary battery or may be a capacitor.

The energy storage device 100 according to this embodiment includes a container 110, a positive electrode terminal 102, and a negative electrode terminal 103. Further, an electrode assembly, a positive electrode current collector, and a negative electrode current collector are arranged in the inside of the container 110.

The container 110 is formed of: a metal-made bottomed body having a rectangular cylindrical shape; and a metal-made lid portion which closes an opening of the body. The container 110 is configured such that the electrode assembly and the like are housed in the inside of the container 110 and, thereafter, the container 110 is hermetically sealed by joining the lid portion and the body to each other by welding or the like.

The positive electrode terminal 102, the negative electrode terminal 103, and a safety valve 104 are mounted on the lid portion of the container 110. When an inner pressure of the container 110 is increased, the safety valve 104 is opened so that a gas is discharged from the container 110.

A kind of the electrode assembly which the energy storage device 100 includes is not particularly limited. However, for example, a wound-type electrode assembly which is formed by winding a layered body where a separator is sandwiched between the positive electrode and the negative electrode in a layered manner is housed in the container 110.

The positive electrode terminal 102 is an electrode terminal which is electrically connected to a positive electrode of the electrode assembly via a positive electrode current collector, and the negative electrode terminal 103 is an electrode terminal which is electrically connected to a negative electrode of the electrode assembly via a negative electrode current collector.

That is, the positive electrode terminal 102 and the negative electrode terminal 103 are metal-made electrode terminals for leading out electricity stored in the electrode assembly to a space outside the energy storage device 100 and for introducing electricity to an inner space of the energy storage device 100 for storing electricity in the electrode assembly.

A plurality of energy storage devices 100 in the inside of the energy storage unit 30 are connected to each other in series or in parallel via the positive electrode terminals 102 and the negative electrode terminals 103.

The electrical connection mode of a plurality of energy storage devices 100 is not particularly limited. In this embodiment, four pairs of energy storage devices 100 are provided where each pair is formed of energy storage devices 100 arranged parallel to each other, and four pairs of energy storage devices 100 are connected in series. Both the electrical connection between the energy storage devices 100 and the electrical connection between eight energy storage devices 100 and the positive electrode external terminal 21 and the negative electrode external terminal 22 are performed via bus bars 32.

The spacer 200 is arranged between two energy storage devices 100 arranged adjacently to each other, and is a resin-made plate-like insulating member which insulates two energy storage devices 100 from each other.

The spacer 200 is formed such that the spacer 200 covers an approximately half of a front surface side or a back surface side of the energy storage device 100 (an approximately half when the energy storage device 100 is divided in two in the Z axis direction). That is, a recessed portion is formed on both surfaces (both surfaces in the Z axis direction) on a front surface side and a back surface side of the spacer 200 respectively, and an approximately half of the energy storage device 100 is inserted in the recessed portions respectively.

Accordingly, the spacer 200 and the energy storage device 100 arranged adjacently to the spacer 200 are brought into the relationship where the spacer 200 and the energy storage device 100 restrict the sideward movement (the movement in the direction parallel to an X-Y plane) thereof from each other. Further, such a relationship is continuously established in the arrangement direction (Z axis direction) along which the energy storage devices 100 and the spacers 200 are arranged alternately.

In this embodiment, engaging portions which can restrict the position of the bus bar frame 130 is formed on each spacer 200. To be more specific, the spacer 200 includes a first engaging portion 211 which projects toward a viewer's side (a plus side in the X axis direction) in FIG. 4, and two second engaging portions 212 which project upwardly (a plus side in the Y axis direction) in FIG. 4. Each spacer 200 also has a first engaging portion 211 which projects toward a minus side in the X axis direction.

Although the spacer 200 is made of an insulating resin such as poly carbonate or PP, for example, the spacer 200 may be made of any material provided that the spacer 200 is formed of a member having an insulating property.

Next, the bus bar frame 130 according to the embodiment and the structure around the bus bar frame 130 are described by reference to FIG. 5 to FIG. 9B.

Figure 5:
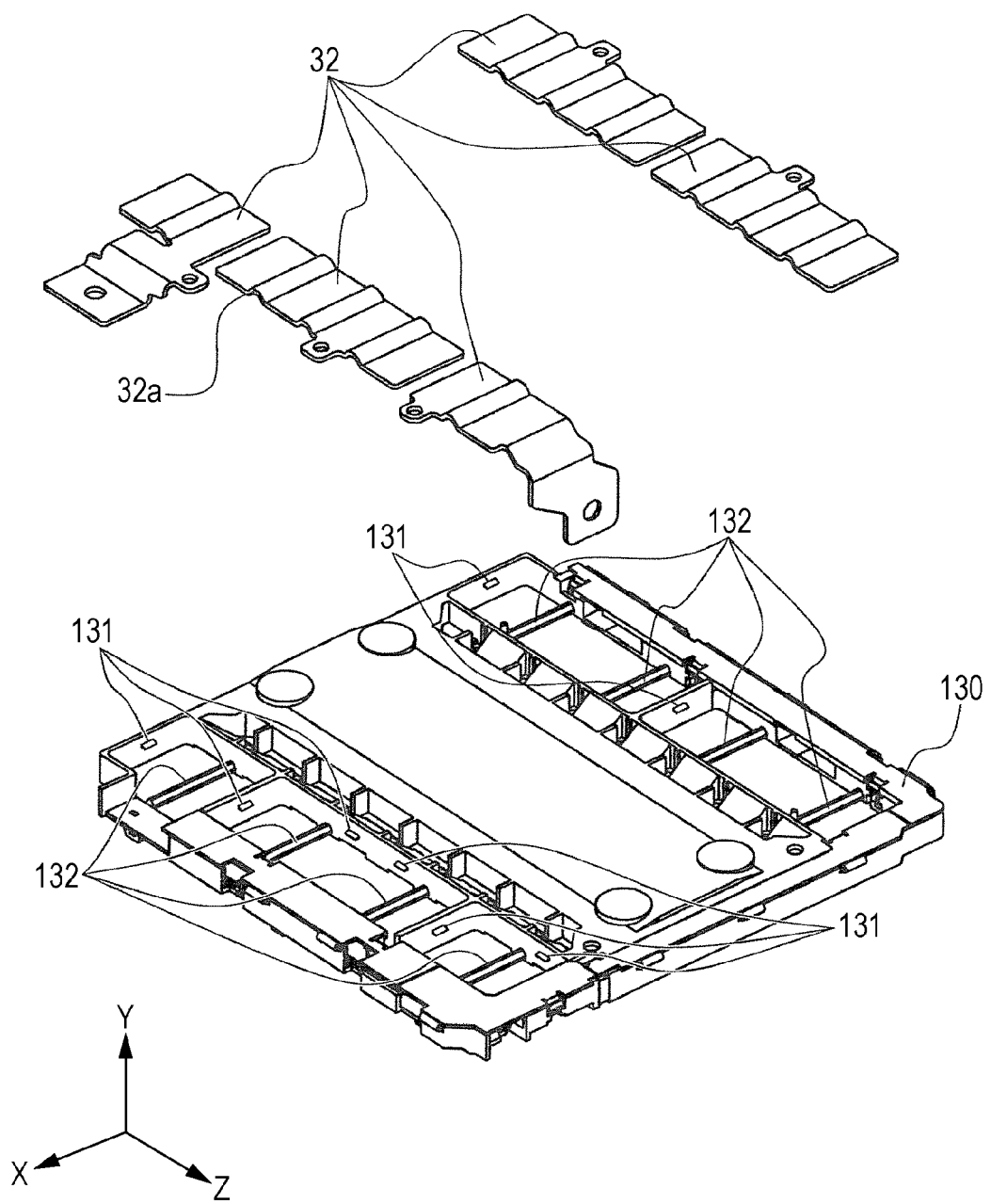
FIG. 5 is a perspective view showing the schematic configuration of a bus bar frame according to the embodiment.

FIG. 5 is a perspective view showing the schematic configuration of the bus bar frame 130 according to the embodiment.

FIG. 6 is a plan view showing the schematic configuration of the bus bar frame 130 according to the embodiment.

Figure 7A:
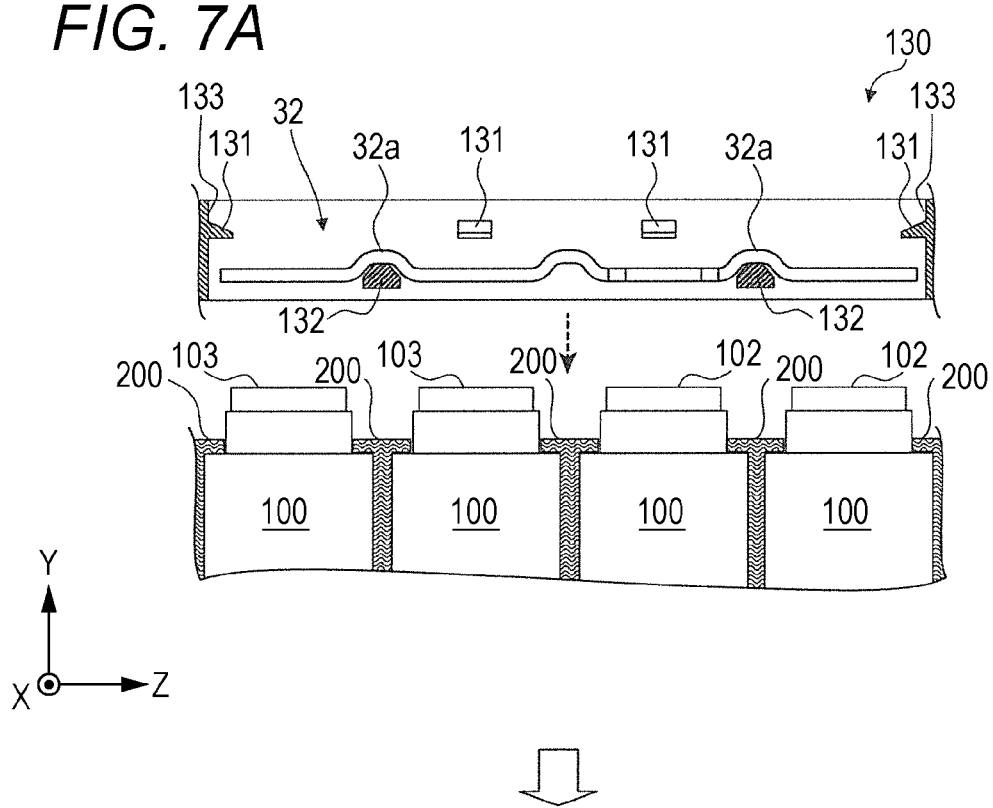
FIG. 7A and FIG. 7B are partial cross-sectional views showing the manner of mounting the bus bar frame according to the embodiment on a plurality of energy storage devices.
Figure 7B:
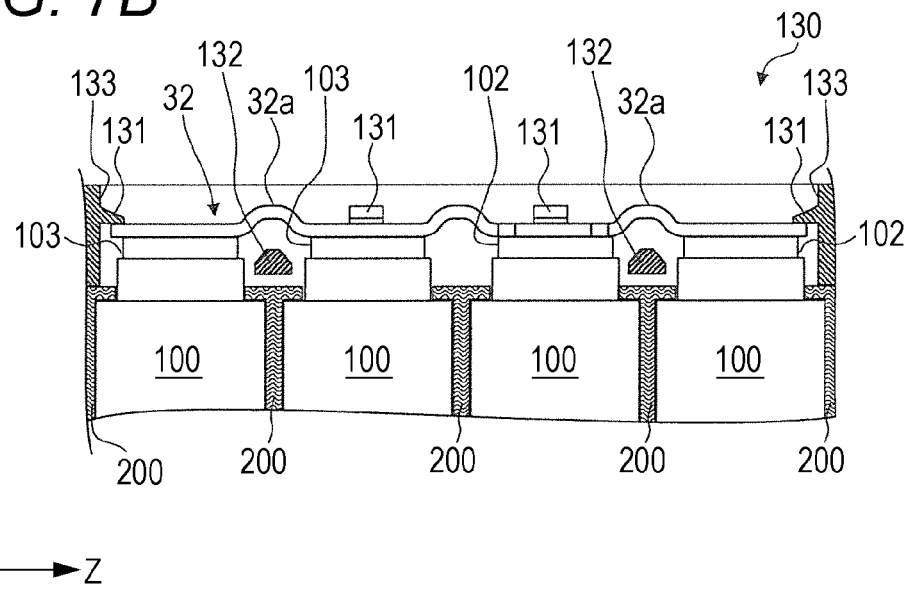

FIG. 7A and FIG. 7B are partial cross-sectional views showing the manner of mounting the bus bar frame 130 on the plurality of energy storage devices 100.

To facilitate the viewing of the bus bar frame 130, FIG. 5 shows a state where the bus bar frame 130 is divided into five bus bars 32 in a separated state.

FIG. 6 shows an approximately half portion (a portion on a plus side in the X axis direction) of the bus bar frame 130. Further, in FIG. 6, a dotted region is illustrated on a back side (a minus side in the Y axis direction) of the bus bar frame 130 for facilitating the identification of portions which penetrate the bus bar frame 130.

FIG. 7A and FIG. 7B show a cross section of the bus bar frame 130 and the spacer 200 around the center bus bar 32 out of three bus bars 32 on a viewer's side (a plus side in the X axis direction) in FIG. 5. In FIG. 7A and FIG. 7B, the bus bars 32 and the respective energy storage devices 100 are not shown in a cross-sectional view but are shown in a side view as viewed from a plus side in the X axis direction.

The bus bar frame 130 according to this embodiment is made of an insulating resin such as PP, and is a member which can insulate the respective bus bars 32 and other members from each other, can protect various kinds of lines and the like arranged in the inside of the energy storage apparatus 1, and can restrict the positions of the respective bus bars 32.

As shown in FIG. 5 to FIG. 7B, the bus bar frame 130 has pressing portions 131 which are brought into contact with the bus bars 32 from a side opposite to the plurality of energy storage devices 100. In this embodiment, the pressing portions 131 are arranged such that at least two pressing portions 131 are brought into contact with five bus bars 32 arranged on the bus bar frame 130 respectively.

When the plurality of bus bars 32 are arranged on the bus bar frame 130, each of the plurality of bus bars 32 is separated from metal members such as other bus bars 32 in the direction parallel to the X-Z plane by partition wall portions 133 of the bus bar frame 130 (see FIG. 6). With such a configuration, for example, when a strong impact is applied to the energy storage apparatus 1, it is possible to suppress the occurrence of short-circuiting caused by a contact between the bus bars 32.

The bus bar frame 130 has support portions 132 which temporarily support the bus bars 32 respectively at the time of manufacturing the energy storage apparatus 1. To be more specific, as shown in FIG. 6, FIG. 7A and FIG. 7B, the support portions 132 are arranged at positions corresponding to recessed portions 32a which are formed by bending portions of the bus bar 32.

As shown in FIG. 7A, the bus bar 32 is arranged on the bus bar frame 130 having the above-mentioned configuration such that the bus bar 32 is supported by one or more support portions 132. In this case, the bus bar 32 is arranged on the bus bar frame 130 in a state where the plurality of pressing portions 131, which are eventually brought into contact with the bus bar 32 from above (a plus side in the Y axis direction), are elastically deformed by the bus bar 32. Alternatively, by inclining the bus bar 32, the bus bar 32 gets over the plurality of pressing portions 131 and is supported by one or more support portions 132.

The bus bar frame 130 on which the plurality of bus bars 32 are arranged as described above is then arranged on an electrode terminal side of the plurality of energy storage devices 100 which are collectively joined together by the restraining member (hereinafter, also referred to as "assembly of the energy storage devices 100").

As a result, as shown in FIG. 7B, the bus bar 32 is separated from one or more support portions 132 by which the bus bar 32 has been supported, is brought into contact with electrode terminals of at least two energy storage devices 100, and the pressing portions 131 are brought into contact with the bus bar 32 from a side opposite to the plurality of energy storage devices 100 (a plus side in the Y axis direction).

To be more specific, the bus bar 32 shown in FIG. 7B is brought into contact with the negative electrode terminals 103 of the two energy storage devices 100 on a left side (first pair) respectively, and is brought into contact with the positive electrode terminals 102 of two energy storage devices 100 on a right side (first pair) respectively. Further, the bus bar 32 receives a pressing force from four pressing portions 131 which are brought into contact with a surface of the bus bar 32 on a side opposite to these four electrode terminals.

In such a state, the movement of the bus bar frame 130 to a side opposite to the plurality of energy storage devices 100 (a plus side in the Y axis direction) is restricted. As a result, the bus bar 32 is positionally restricted (positioned) by being brought into pressure contact with four electrode terminals and, in such a state, the bus bar 32 is joined to the respective electrode terminals by welding such as laser welding.

For example, second restriction portions 136 shown in FIG. 6 which the bus bar frame 130 has are engaged with second engaging portions 212 (see FIG. 4) of the spacers 200 which are arranged directly below the second restriction portions 136 respectively thus functioning as portions which restrict the movement of the bus bar frame 130 toward a plus side in the Y axis direction.

Through holes 136a existing on a side of second restriction portions 136 are holes through which the second engaging portions 212 of the spacer 200 arranged directly below the through holes 136a pass. The through holes 136a do not have a function of being engaged with the second engaging portion 212. That is, the through holes 136a are formed in the bus bar frame 130 as portions for preventing the second engaging portions 212 and the bus bar frame 130 from interfering with each other.

Hereinafter, by reference to FIG. 8 to FIG. 9B, the structure for restricting the movement of the bus bar frame 130 (the structure for fixing the bus bar frame 130) which the energy storage apparatus 1 according to this embodiment has is described in detail.

Figure 8:
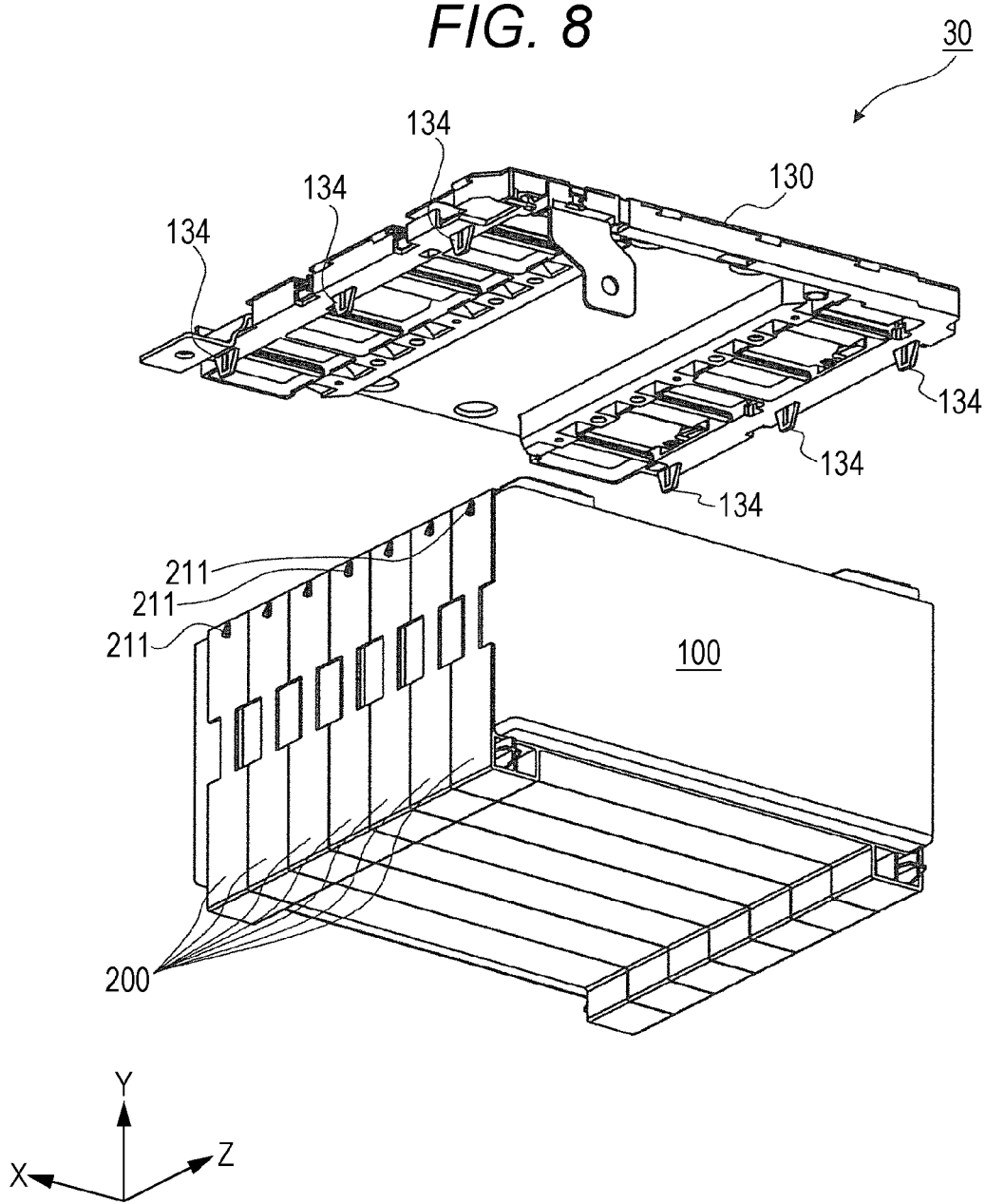
FIG. 8 is a second perspective view showing the configuration of the energy storage unit according to the embodiment.

FIG. 8 is a second perspective view showing the configuration of the energy storage unit 30 according to the embodiment. To be more specific, FIG. 8 is an exploded perspective view of the energy storage unit 30 in a state where the assembly of the energy storage devices 100 and the bus bar frame 130 are separated from each other as viewed from an oblique low position. In FIG. 8, the illustration of the sandwiching member 190 is omitted.

Figure 9A:
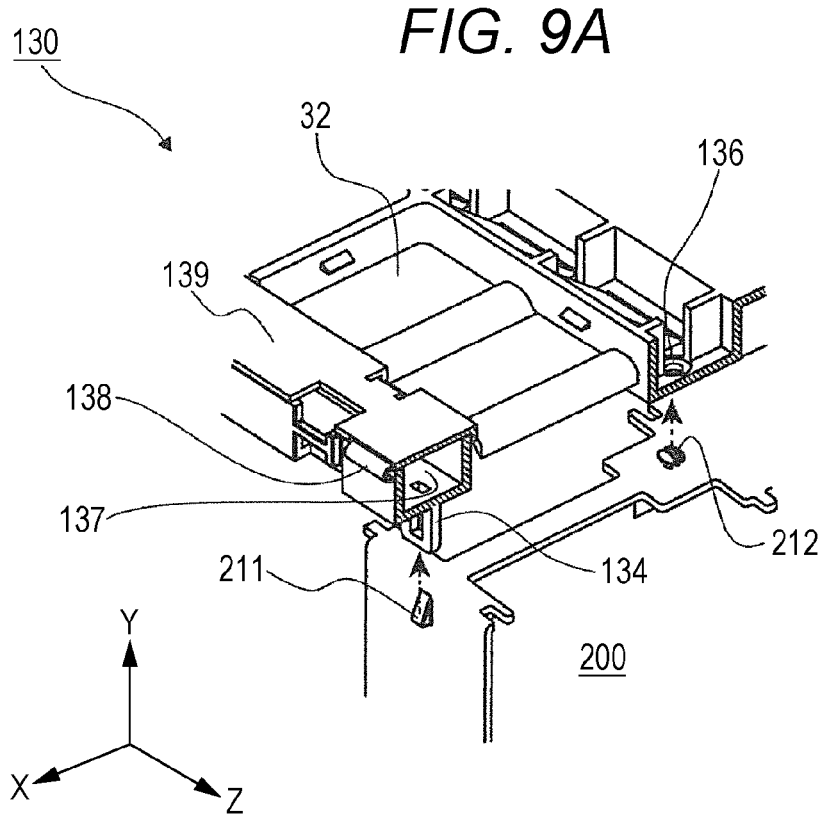
FIG. 9A is an exploded perspective view showing the positional relationship between a restriction portion of the bus bar frame and an engaging portion of the spacer.
Figure 9B:
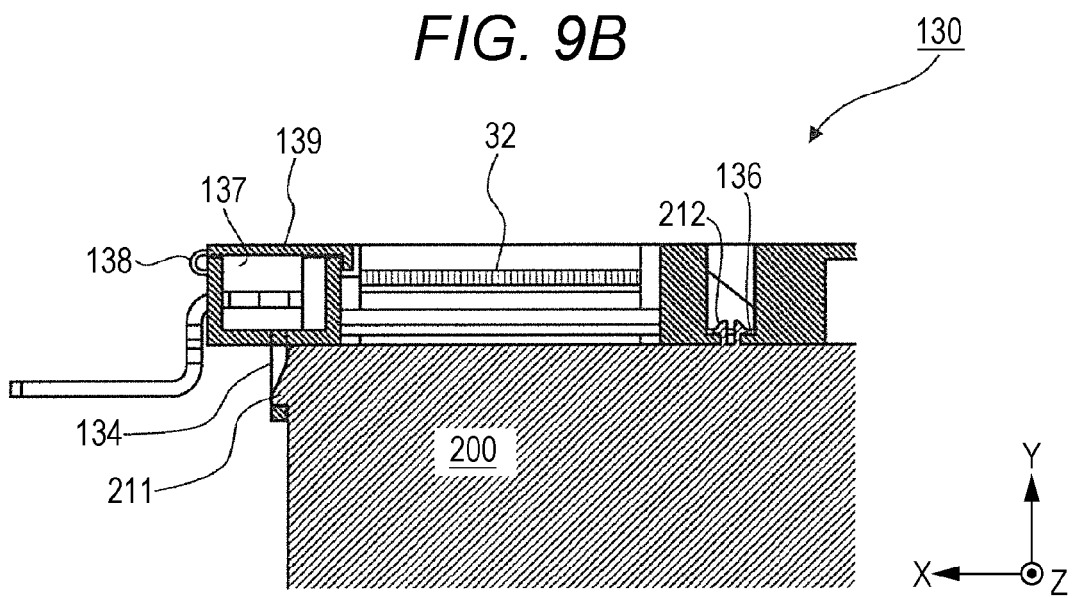
FIG. 9B is a cross-sectional view showing a state where the restriction portion of the bus bar frame is engaged with the engaging portion of the spacer.

FIG. 9A is an exploded perspective view showing the positional relationship between the restriction portions of the bus bar frame 130 and the engaging portions of the spacer 200, and FIG. 9B is a cross-sectional view showing a state where the restriction portions of the bus bar frame 130 are engaged with the engaging portions of the spacer 200.

FIG. 9A shows a state before the bus bar frame 130 is engaged with the spacer 200. In FIG. 9A, the illustration of the energy storage devices 100 is omitted. FIG. 9A is a partially enlarged view of the bus bar frame 130 in a state where the bus bar frame 130 is cut along a plane parallel to the X-Y plane for explicitly showing the first restriction portion 134 and the second restriction portion 136.

FIG. 9B shows a partial cross section of the bus bar frame 130 and the spacer 200 in a mutually engaged state at a center position of the spacer 200 in the Z axis direction.

As shown in FIG. 8 to FIG. 9B, the bus bar frame 130 has the first restriction portions 134 which restrict the movement of the bus bar frame 130 toward a side opposite to the plurality of energy storage devices 100 (a plus side in the Y axis direction) by being engaged with the first engaging portions 211 of the spacers 200.

As described previously, the bus bar frame 130 has the second restriction portions 136 which restrict the movement of the bus bar frame 130 toward a side opposite to the plurality of energy storage devices 100 (a plus side in the Y axis direction) by being engaged with the second engaging portions 212 of the spacers 200.

To be more specific, as shown in FIG. 8, the first restriction portion 134 is formed on the bus bar frame 130 at positions where the first restriction portions 134 are engageable with the first engaging portions 211 of the first, fourth and seventh spacers 200 respectively as counted from the end of the bus bar frame 130 out of seven spacers 200 arranged in a row in the Z axis direction. As described above, each spacer 200 has the first engaging portions 211 also on a depth side in FIG. 4 (a minus side in the X axis direction). That is, the bus bar frame 130 includes six first restriction portions 134 corresponding to six first engaging portions 211 in total which three spacers 200 have.

In this embodiment, the first restriction portion 134 is formed on an end portion of the bus bar frame 130 as a projecting member having a hole, and the first restriction portion 134 is engaged with the first engaging portion 211 by inserting the first engaging portion 211 which is formed in a projecting manner from a side surface of the spacer 200 into the hole.

In this manner, one or more first engaging portions 211 which the bus bar frame 130 has are engaged with the first engaging portions 211 respectively and, due to such an engagement, the movement of the bus bar frame 130 toward a plus side in the Y axis direction is restricted. As a result, a state where one or more pressing portions 131 of the bus bar frame 130 are respectively brought into pressure contact with the corresponding bus bars 32 is maintained so that the positions of the respective bus bars 32 are restricted (see FIG. 7B).

The engaging mode between the first restriction portion 134 and the first engaging portion 211 is not limited to the above-mentioned mode. For example, the first restriction portion 134 and the first engaging portion 211 may be engaged with each other by inserting a projection or a pawl which the first restriction portion 134 has into a hole or a recessed portion which the first engaging portion 211 has.

The bus bar frame 130 may have fourteen first restriction portions 134 so as to be engageable with fourteen first engaging portions 211 which seven spacers 200 have in total, for example.

That is, it is sufficient that one or more first restriction portions 134 are formed on the bus bar frame 130 so as to be engaged with one or more first engaging portions 211 selected from the first engaging portions 211 which the plurality of spacers 200 respectively have. Accordingly, for example, it is also possible to decide the number and the positions of the first restriction portions 134 corresponding to the structure of the energy storage apparatus 1 or the specification or the like to be satisfied by the energy storage apparatus 1.

Further, in the bus bar frame 130, as shown in FIG. 9A and FIG. 9B, the second restriction portions 136 are arranged at positions corresponding to the second engaging portions 212 formed on a surface of the spacer 200 on a bus bar frame side.

That is, the first restriction portions 134 and the second restriction portions 136 are arranged in a row in the second direction (X axis direction) which intersects with the first direction (Z axis direction), and the first restriction portions 134 and the second restriction portions 136 are also arranged on sides opposite to each other with the bus bar 32 sandwiched therebetween.

The second restriction portions 136 which are arranged at positions with respect to the first restriction portions 134 are engaged with the second engaging portions 212 so that the movement of the bus bar frame 130 toward a plus side in the Y axis direction is restricted.

That is, both the first restriction portions 134 and the second restriction portions 136 function as portions for restricting the movement of the bus bar frame 130 toward a plus side in the Y axis direction. As a result, for example, the bus bars 32 positioned between the first restriction portions 134 and the second restriction portions 136 are pressed by one or more pressing portions 131 which the bus bar frame 130 has in a well-balanced manner.

With such a configuration, it is possible to restrict the positions of the bus bars 32 at the time of joining the bus bar 32 to the electrode terminals (102 or 103) of the energy storage device 100 in a more stable manner and with high accuracy.

The arrangement direction in which the first restriction portions 134 and the second restriction portions 136 are arranged may not agree with the X axis direction. That is, provided that the first restriction portions 134 and the second restriction portions 136 are arranged in the direction intersecting with the arrangement direction of the plurality of energy storage devices 100 and are arranged on sides opposite to each other with the bus bar 32 sandwiched therebetween, the energy storage apparatus 1 can acquire the above-mentioned advantageous effects that the bus bar 32 is pressed in a well-balanced manner.

The first restriction portions 134 are positioned on sides of a plurality of energy storage devices 100 in the second direction (X axis direction), and the second restriction portions 136 are positioned on a side of a surface of the plurality of energy storage devices 100 where the electrode terminals (102, 103) are arranged. With such a configuration, the bus bar frame 130 is made to press the bus bars 32 in a well-balanced manner by effectively making use of a space around the plurality of energy storage devices 100.

In this embodiment, as can be understood from FIG. 4 and FIG. 6, for example, the second restriction portions 136 are arranged at positions between the safety valves 104 of the plurality of energy storage devices 100 and the electrode terminals (102 or 103) in the second direction (X axis direction). That is, in the energy storage apparatus 1, the second restriction portions 136 and the second engaging portions 212 are arranged at positions where the second restriction portions 136 and the second engaging portions 212 minimally obstruct the discharging of a gas from the safety valves 104 of the respective energy storage devices 100.

In this embodiment, the second restriction portion 136 has a hole which penetrates the bus bar frame 130 in the Y axis direction. By inserting the second engaging portion 212 of the spacer 200 formed in a projecting manner from a surface of the spacer 200 on a bus bar frame side into the hole, the second restriction portion 136 is engaged with the second engaging portion 212.

To be more specific, as shown in FIG. 9B, the second engaging portion 212 is a projection where an outer diameter of a distal end portion is set larger than diameters of other portions, and the second engaging portion 212 has a groove for facilitating reducing of an outer diameter of the second engaging portion 212 by making use of elastic deformation. The second engaging portion 212 is configured such that the distal end portion of the second engaging portion 212 is inserted into the hole of the second restriction portion 136 while reducing the outer diameter thereof, and the distal end portion returns to an original outer diameter due to elasticity after the completion of insertion and hence, the distal end portion cannot be removed from the hole formed in the second restriction portion 136.

It is sufficient to form one or more second restriction portions 136 on the bus bar frame 130 such that these second restriction portions 136 are engaged with one or more second engaging portions 212 selected from g group of second engaging portions 212 which the plurality of spacers 200 respectively have. Accordingly, the number and the positions of the second restriction portions 136 may be decided corresponding to the structure of the energy storage apparatus 1 or the specification and the like to be satisfied by the energy storage apparatus 1.

The mode of engagement between the second restriction portion 136 and the second engaging portion 212 is not limited to the above-mentioned mode. For example, the second restriction portion 136 and the second engaging portion 212 may be engaged with each other by inserting a projection or a pawl which the second restriction portion 136 has into a hole or a recessed portion which the second engaging portion 212 has.

In the energy storage apparatus 1 according to this embodiment, plural pairs each of which is formed of the first restriction portion 134 and the second restriction portion 136 are arranged in a row in the first direction (Z axis direction) in the bus bar frame 130.

To be more specific, as can be understood from FIG. 6, FIG. 8 and the like, three pairs each of which is formed of the first restriction portion 134 and the second restriction portion 136 are arranged in a row in the Z axis direction on a plus side in the X axis direction of the bus bar frame 130. Also on a minus side in the X axis direction of the bus bar frame 130, three pairs each of which is formed of the first restriction portion 134 and the second restriction portion 136 are arranged in a row in the Z axis direction.

With such a configuration, five bus bars 32 arranged in this embodiment can be pressed in the direction toward the plurality of energy storage devices 100 in a well-balanced manner by a plurality of pressing portions 131 which the bus bar frame 130 has. As a result, the restriction of positions of the respective bus bars 32 can be performed in a more stable manner with high accuracy at the time of joining the respective bus bars 32 to the electrode terminals (102 or 103) of the energy storage devices 100.

The number and the positions of the second restriction portions 136 may be decided independently from the number and the positions of the first restriction portions 134. Further, the members for restricting the movement of the pair which is formed of the first restriction portion 134 and the second restriction portion 136 with the bus bar 32 sandwiched therebetween may be the same members or may be members different from each other. That is, by restricting the movement of at least one of the first restriction portion 134 and the second restriction portion 136 by other member such as the spacer 200, the movement of the bus bar frame 130 can be restricted and, as a result, the restriction of the position (positioning) of the bus bar 32 can be performed.

As shown in FIG. 9A and FIG. 9B, the bus bar frame 130 according to this embodiment has a wiring housing portion 137 in which various kinds of lines (signal lines, power lines and the like) are housed. To be more specific, the bus bar frame 130 has: a passage portion which is formed into a recessed shape on a peripheral portion of the bus bar frame 130; and a lid portion 139 which closes an opening of the passage portion which opens upwardly. That is, an inner space of the passage portion functions as the wiring housing portion 137.

The lid portion 139 is rotatably and pivotally mounted on a main body of the bus bar frame 130 by means of a hinge 138.

When the bus bar frame 130 having the above-mentioned constitution is mounted on the assembly of the energy storage device 100, for example, lines such as lead lines which connect sensors arranged on the respective energy storage devices 100 and the electric equipment 40 to each other are housed in the wiring housing portion 137, and the lid portion 139 is closed.

With such a configuration, it is possible to suppress many lines existing around the assembly of the energy storage devices 100 from obstructing the mounting operation of the bus bar frame 130. This contributes to the enhancement of the productivity of the energy storage apparatus 1.

After the bus bar frame 130 is mounted on the assembly of the energy storage devices 100, a welding operation is applied to the respective bus bars 32 which are positionally restricted by the bus bar frame 130.

In performing such a welding operation, the various kinds of lines are housed in the wiring housing portion 137 which is closed by the lid portion 139 and hence, it is possible to protect various kinds of lines from sparks and the like generated by welding, for example.

As has been described heretofore, the energy storage apparatus 1 according to this embodiment includes a plurality of energy storage devices 100 arranged in a row in the first direction (Z axis direction). The energy storage apparatus 1 also includes the bus bars 32 which are connected to the electrode terminals (102 or 103) of at least two energy storage devices 100 out of the plurality of energy storage devices 100, and the bus bar frame 130 having the pressing portions 131 which are brought into contact with the bus bars 32 from a side opposite to the plurality of energy storage devices 100.

The bus bar frame 130 has the restriction portions whose movement toward a side opposite to the plurality of energy storage devices 100 (a plus side in the Y axis direction) is restricted by other members which are members other than the bus bar frame 130. That is, the bus bar frame 130 has the restriction portions whose movement toward a side opposite to the plurality of energy storage devices 100 is restricted with respect to the bus bars 32 which are used as the reference.

In this embodiment, the restriction portions are formed of the first restriction portions 134 and the second restriction portions 136, or are formed of the combination of the first restriction portions 134 and the second restriction portions 136. Further, in this embodiment, the above-mentioned other members are one or more spacers 200. The spacers 200 which are engaged with at least one of the first restriction portions 134 and the second restriction portions 136 are one example of the first spacers.

With such a configuration, it is possible to maintain the bus bars 32 in a normal posture at a normal position by the bus bar frame 130 at the time of manufacturing the energy storage apparatus 1. Further, a joining operation (laser welding or the like) of the bus bar also can be performed with high accuracy.

Accordingly, it is possible to obtain the energy storage apparatus 1 where the bus bars 32 are easily joined to the electrode terminals (102 or 103) of the energy storage devices 100. Further, it is also possible to obtain the energy storage apparatus 1 having high joining reliability between the bus bars 32 and the electrode terminals (102 or 103) of the energy storage devices 100.

The bus bar frame 130 can perform at least three functions, that is, a function of insulating the respective bus bars 32 and other members from each other, a function of protecting the various kinds of lines arranged in the energy storage apparatus 1, and a function of restricting the positions of the respective bus bars 32. With such a configuration, the energy storage apparatus 1 can acquire advantageous effects such as the reduction of the number of parts of the energy storage apparatus 1, the enhancement of the productivity of the energy storage apparatus 1, the suppression of a manufacturing cost of the energy storage apparatus 1, the miniaturization of the energy storage apparatus 1.

In case of an energy storage apparatus of a type where electrode terminals and bus bars are fastened together using bolts and nuts, for example, there is a possibility that the fastening is loosened due to vibrations applied to the energy storage apparatus at the time of using the energy storage apparatus. On the other hand, when the electrode terminals and the bus bars 32 are joined to each other by welding such as laser welding as in the case of the energy storage apparatus 1 according to this embodiment, the joining is minimally loosened and hence, the reliability of the joining between the electrode terminals and the bus bars 32 is increased compared to the case where the electrode terminals and the bus bars are fastened together using the bolts and the nuts.

However, when the electrode terminals and the bus bars 32 are joined to each other by welding, the electrode terminals and the bus bars 32 are welded to each other in a state where the electrode terminals and the bus bars 32 are brought into surface face contact with each other. Accordingly, there arises a problem how to restrict the positions (perform positioning of) the bus bars 32 with respect to the electrode terminals at the time of welding. As a solution to overcome this problem, a method using a dedicated jig for restricting the positions of the bus bars 32, a method of incorporating a dedicated part for temporarily fixing the bus bars 32 in the energy storage apparatus 1 and the like into the energy storage apparatus 1 are considered. However, it is not considered preferable to adopt these solutions from a viewpoint of the productivity of the energy storage apparatus 1 and the like.

Therefore, in the energy storage apparatus 1 according to this embodiment, as described above, the pressing portions 131 which play a role of insulating the bus bars 32 arranged adjacently to each other are formed on the bus bar frame 130. With such a configuration, the bus bar frame 130 is made to restrict the positions of the bus bars 32 at the time of welding the electrode terminals and the bus bars 32 to each other. As a result, the energy storage apparatus 1 can acquire both an advantageous effect that the energy storage apparatus 1 can be manufactured efficiently and an advantageous effect that the reliability of the joining between the bus bars 32 and the electrode terminals can be enhanced.

The energy storage apparatus 1 may include an energy storage unit having the constitution different form the configuration of the energy storage unit 30 shown in FIG. 2 to FIG. 9B. Hereinafter, an energy storage unit 30 according to a modification of the above-mentioned embodiment is described by focusing on the difference between the energy storage apparatus of the modification and the energy storage apparatus of the above-mentioned embodiment.

Modification of Embodiment

Figure 10:
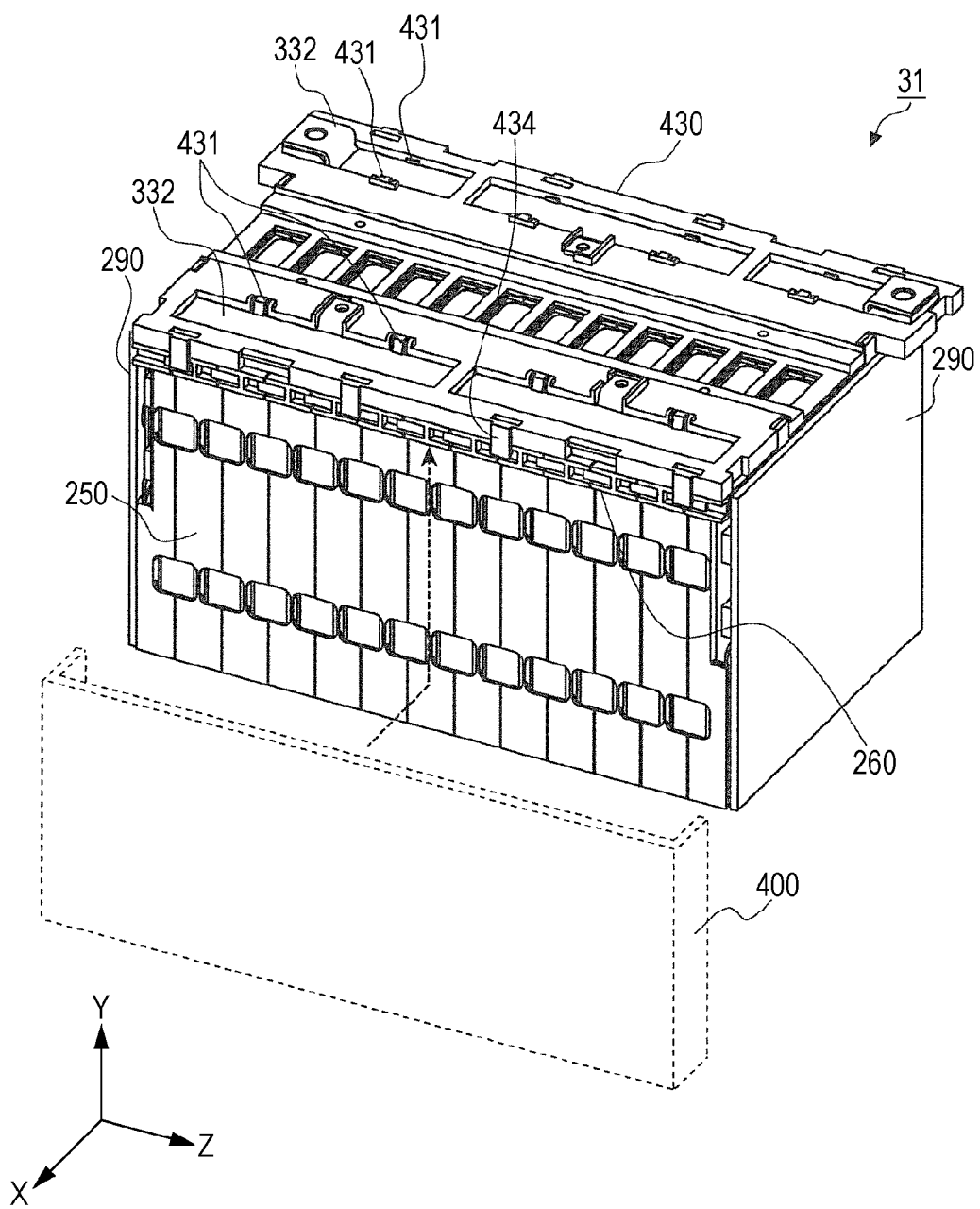
FIG. 10 is a perspective view showing the schematic configuration of an energy storage unit according to a modification of the embodiment.

FIG. 10 is a perspective view showing the schematic configuration of an energy storage unit 31 according to the modification of the embodiment.

Figure 11:
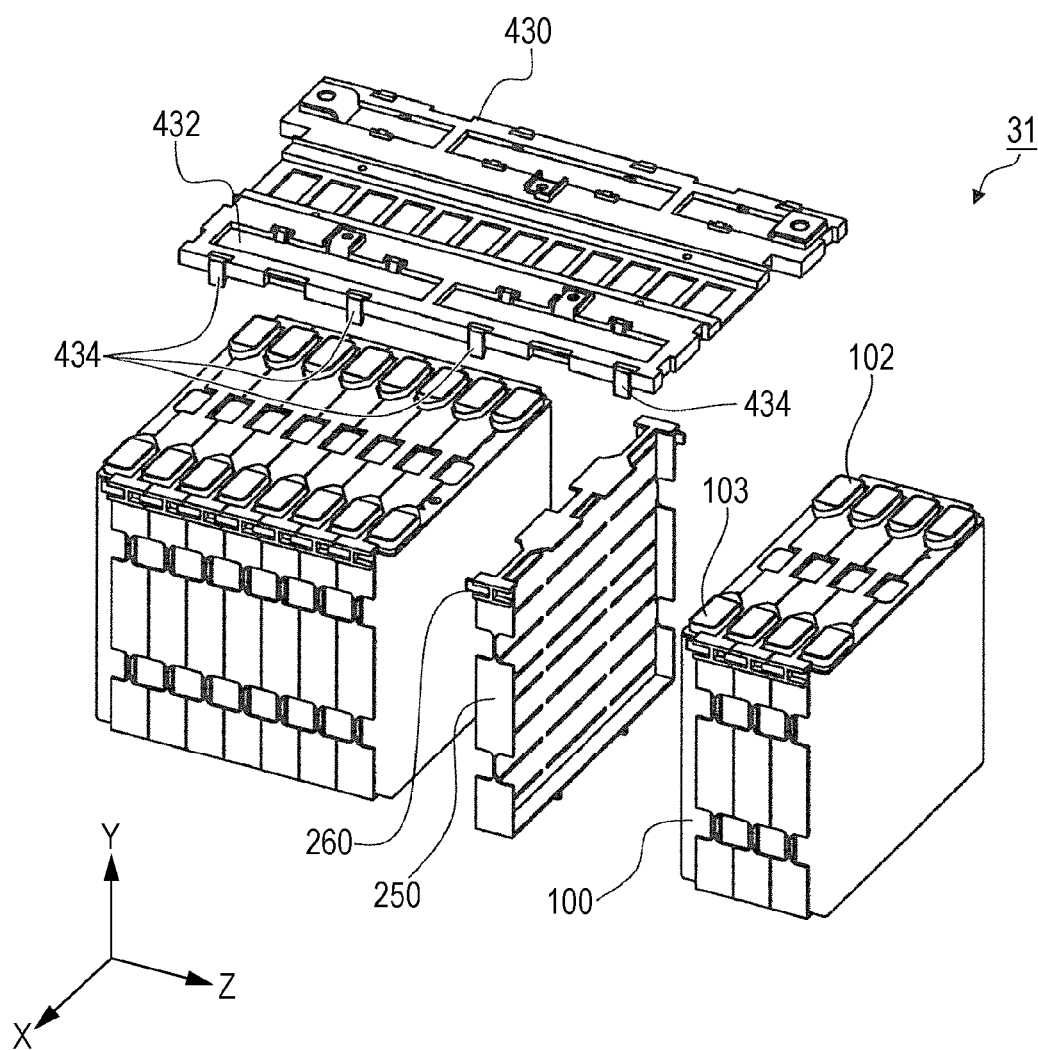
FIG. 11 is an exploded perspective view of the energy storage unit according to the modification of the embodiment.

FIG. 11 is an exploded perspective view of the energy storage unit 31 according to the modification of the embodiment.

The energy storage unit 31 according to the modification includes, in the same manner as the energy storage unit 30 according to the above-mentioned embodiment, one or more energy storage devices 100. That is, in the modification, the energy storage apparatus 1 includes the energy storage unit 31 in place of the energy storage unit 30.

That is, the energy storage unit 31 is housed in an outer package body on which a positive electrode external terminal and a negative electrode external terminal are arranged, can store electricity charged from the outside, and can discharge electricity to the outside. Here, although a shape, the structure and the like of an outer package body which houses the energy storage unit 31 therein are not particularly limited, in the same manner as the outer package body 10 according to the above-mentioned embodiment, the outer package body is made of an insulating resin such as polycarbonate or PP.

In this embodiment, the energy storage unit 31 includes twelve energy storage devices 100 and eleven spacers 250. These energy storage devices 100 and the spacers 250 are arranged alternately, and an assembly of the energy storage devices 100 formed as described above is held in a sandwiched manner between a pair of sandwiching members 290 from both sides in the arrangement direction (Z axis direction) of the energy storage devices 100.

A bus bar frame 430 on which bus bars 432 are arranged is mounted on a plurality of energy storage devices 100, and the plurality of energy storage devices 100 are connected in series or in parallel by the plurality of bus bars 432. In this modification, four groups each of which is formed of three energy storage devices 100 connected in parallel to each other are formed, and these four groups are connected in series.

The number of energy storage devices 100 which the energy storage unit 31 includes and an electric connection mode of the energy storage devices 100 are not limited to the number of energy storage devices 100 and the connection mode described above. Further, a kind of energy storage devices 100 which the energy storage unit 31 includes may be the same as the energy storage devices 100 which the energy storage unit 30 according to the above-mentioned embodiment includes or may differ from the energy storage devices 100 which the energy storage unit 30 includes.

The bus bar frame 430 according to this modification is, in the same manner as the bus bar frame 130 according to the above-mentioned embodiment, made of an insulating resin such as PP. Further, the bus bar frame 430 is a member which can insulate the bus bars 432 from each other, and can restrict the positions of the respective bus bars 432.

The bus bar frame 430 has pressing portions 431 which are brought into contact with the bus bars 432 from a side opposite to a plurality of energy storage devices 100. In this modification, the pressing portions 431 are arranged such that at least two pressing portions 431 are brought into contact with each of five bus bars 432 arranged on the bus bar frame 430.

The bus bar frame 430 has restriction portions 434 whose movement toward a side opposite to a plurality of energy storage devices 100 is restricted by other members which are members other than the bus bar frame 430. That is, the bus bar frame 430 has the restriction portions 434 whose movement toward a side opposite to the plurality of energy storage devices 100 is restricted with respect to the bus bars 432 which are used as the reference. In this modification, the other members described above are spacers 250.

The energy storage unit 31 having the above-mentioned configuration is provided with, as characteristic constitutional elements of this modification, projecting portions 260 which are arranged on the spacers 250 respectively.

The projecting portions 260 are one example of the first projecting portions, and the projecting portions 260 can restrict the movement of the bus bar frame 430 toward a side opposite to the plurality of energy storage devices 100 (a plus side in the Y axis direction) by being engaged with the restriction portions 434 of the bus bar frame 430. As a result, the positions of the bus bars 432 are restricted, and the bus bars 432 and the electrode terminals are joined to each other by welding such as laser welding in such a state.

That is, the projecting portions 260 are constitutional elements having the common function as the first engaging portions 211 according to the above-mentioned embodiment.

The projecting portions 260 according to this modification further possess a function of restricting the position of a restraining member 400. The restraining member 400 is a member which applies a restraining force to the plurality of energy storage devices 100 by way of the pair of sandwiching members 290.

To be more specific, as shown in FIG. 10, the restraining member 400 is configured such that the movement of the restraining member 400 toward a side opposite to the restraining member 400 (a plus side in the Y axis direction) with the projecting portions 260 sandwiched therebetween is restricted by being brought into contact with the projecting portions 260. That is, the projecting portions 260 function as guides for positioning the restraining member 400.

With such a configuration, at the time of manufacturing the energy storage apparatus 1 provided with the energy storage unit 31, the positioning of the restraining member 400 can be performed without using a jig or the like. As a result, the energy storage unit 31 can acquire an advantageous effect such as the enhancement of the manufacturing efficiency of the energy storage apparatus 1.

As shown in FIG. 10 and FIG. 11, when the plurality of spacers 250 each having the projecting portions 260 are arranged in a row in the Z axis direction with the energy storage device 100 sandwiched therebetween, a plurality of projecting portions 260 are arranged in a row in the Z axis direction.

That is, a line-shaped structure which restricts the restraining member 400 is formed by the plurality of projecting portions 260 arranged in a row and hence, the positioning of the restraining member 400 can be performed in a more stable manner.

In FIG. 10, a shape of the restraining member 400 indicated by a dotted line is one example, and a shape of the restraining member 400 may be decided corresponding to a raw material of the restraining member 400, a shape of an outer package body which houses the energy storage unit 31 therein or the like. Further, as a material for forming the restraining member 400, for example, metal such as stainless steel or aluminum is adopted.

The projecting portions 260 also have a function of restricting the positions of other spacers 250 in addition to the function of restricting the position of the bus bar frame 430 and the function of restricting the position of the restraining member 400 described above.

Figure 12:
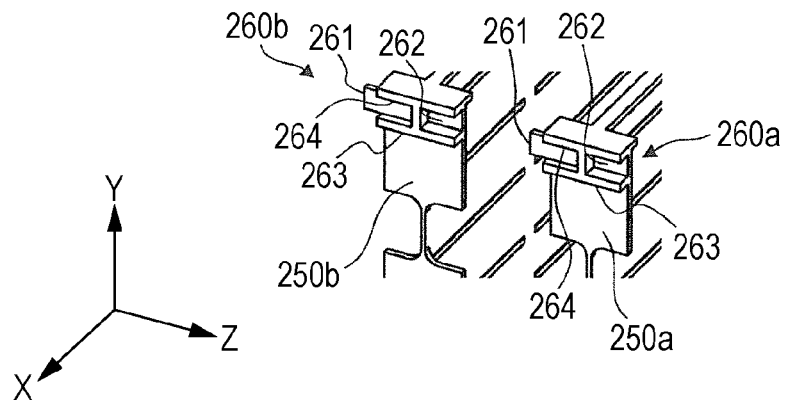
FIG. 12 is an enlarged perspective view showing projecting portions of spacers according to the modification of the embodiment and an area around the projecting portions.

FIG. 12 is an enlarged perspective view showing projecting portions 260 of spacers 250 according to the modification of the embodiment and an area around the projecting portions 260. In FIG. 12, the illustration of the energy storage devices 100 is omitted.

As shown in FIG. 12, the projecting portion 260 has a first wall portion 263 on a restraining member 400 side, a second wall portion 264 on a bus bar frame 430 side, and a protrusion 261 which is disposed between the first wall portion 263 and the second wall portion 264 and protrudes in the first direction (Z axis direction). Further, an insertion portion 262 into which a protrusion 261 of another projecting portion 260 is inserted is formed by a space between the first wall portion 263 and the second wall portion 264 where protrusion 261 is not disposed.

When two spacers 250 each of which is provided with the projecting portions 260 having the above-mentioned constitution are arranged in a row in the first direction (Z axis direction) with the energy storage device 100 sandwiched therebetween, the projecting portions 260 of one spacer 250 are engaged with the projecting portions 260 of the another spacer 250.

For example, as shown in FIG. 12, to express two spacers 250 arranged adjacently to each other as a first spacer 250a and a second spacer 250b respectively, and to express the respective projecting portions 260 of the spacers 250 as a first projecting portion 260a and a second projecting portion 260b, the engagement of the projecting portions 260 are described as follows.

That is, when the first spacer 250a and the second spacer 250b are arranged with one energy storage device 100 sandwiched therebetween, the protrusion 261 of the first projecting portion 260a is inserted into the insertion portion 262 of the second projecting portion 260b. With such a configuration, the first projecting portion 260a and the second projecting portion 260b are engaged with each other.

Such an engagement relationship is established between a plurality of spacers 250 arranged in a row in the Z axis direction. Accordingly, the relative movement between a plurality of spacers 250 and a plurality of energy storage devices 100 in a direction parallel to an X-Y plane is restricted.

That is, the projecting portions 260 formed on the plurality of respective spacers 250 are engaged with neighboring other projecting portions 260 and hence, the assembly of a plurality of energy storage devices 100 can be formed efficiently with high accuracy at the time of manufacturing (assembling) the energy storage apparatus 1. Further, also when the energy storage apparatus 1 is used in service, for example, the energy storage apparatus can acquire an advantageous effect that the occurrence of displacement between the energy storage devices 100 can be suppressed.

The protrusion 261 of the projecting portion 260 and the insertion portion 262 are present between the first wall portion 263 and the second wall portion 264, and a region which makes the restriction portion 434 of the bus bar frame 430 engaged with the second wall portion 264 is present on the second wall portion 264.

Figure 13:
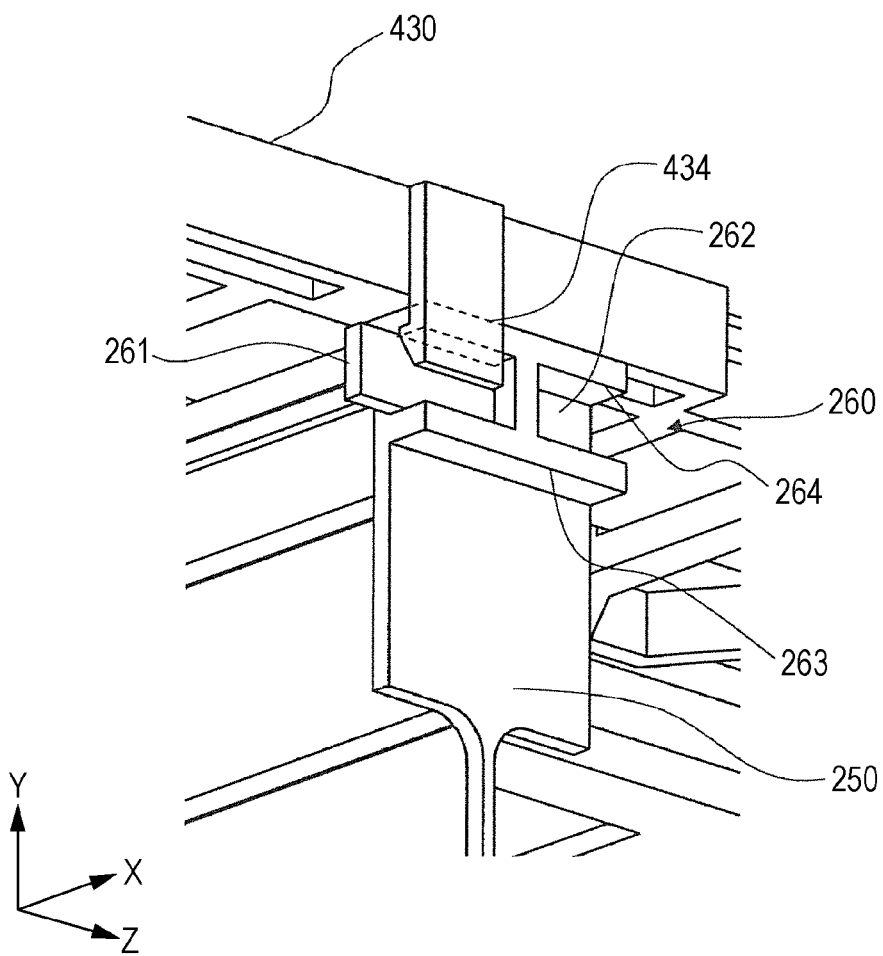
FIG. 13 is an enlarged perspective view showing a state where a restriction portion and the projecting portion according to the modification of the embodiment are engaged with each other.

FIG. 13 is an enlarged perspective view showing a state where the restriction portion 434 and the projecting portion 260 according to the modification of the embodiment are engaged with each other. In FIG. 13, the illustration of the energy storage devices 100 is omitted.

As shown in FIG. 13, the second wall portion 264 of the projecting portion 260 projects outward from an outer side surface of the protrusion 261 (a plus side in the X axis direction). Accordingly, a region which makes a pawl of the restriction portion 434 of the bus bar frame 430 engage with second wall portion 264 is present on the second wall portion 264.

That is, the second wall portion 264 of the projecting portion 260 is a portion which is used for both the engagement between the projecting portion 260 and other projecting portion 260 and the engagement between the projecting portion 260 and the restriction portion 434.

The number and the positions of the restriction portions 434 which the bus bar frame 430 according to this modification has are not limited to the content of the description made heretofore. The number and the positions of the restriction portions 434 which the bus bar frame 430 has may be decided, in the same manner as the bus bar frame 130 according to the above-mentioned embodiment, corresponding to the structure of the energy storage apparatus 1 provided with the energy storage unit 31, the specification to be satisfied by the energy storage apparatus 1 or the like.

Another Embodiment

The energy storage apparatus according to the present invention has been described heretofore by reference to the embodiment and the modification of the embodiment. However, the present invention is not limited to the above-mentioned embodiment and the modification of the embodiment. The configuration obtained by applying various kinds of modifications which those who are skilled in the art come up with to the above-mentioned embodiment or the modification and the configuration constructed by using the above-mentioned plurality of constitutional elements in combination are also included in the scope of the present invention without departing from the gist of the present invention.

For example, the movement of the restriction portions (first restriction portions 134 or the second restriction portions 136) of the bus bar frame 130 may be restricted by members other than the spacers 200. The movement of the restriction portions of the bus bar frame 130 may be restricted by portions of the outer package body 10, parts arranged on the outer package body 10, the energy storage device 100, parts arranged on the container 110 for the energy storage devices 100 or the like, for example. The same goes for the bus bar frame 430 according to the above-mentioned modification, and the projecting portions 260 may be arranged not on the spacers 250 but on the energy storage devices 100, for example.

That is, the members which restrict the movement of the bus bar frame 130 (430) may be members other than the spacers 200 (250). Accordingly, in the energy storage unit 30 (31), the spacers 200 (250) are not indispensable constitutional elements.

Further, the movement of the restriction portions of the bus bar frame 130 (430) may be restricted by the configuration other than the engagement between the spacers 200 (250) or the like and other members. For example, due to the fastening, the adhesion, the welding or the like between the restriction portions of the bus bar frame 130 (430) and other members such as the spacers 200 (250), the movement of the restriction portions of the bus bar frame 130 (430) may be restricted by other members.

The present invention is applicable to an energy storage apparatus and the like provided with a plurality of energy storage devices.

What is claimed is:

1. An energy storage apparatus, comprising:
   a plurality of energy storage devices arranged in a row in a first direction extending in an arrangement direction of the plurality of energy storage devices;
   a bus bar connected to electrode terminals of at least two energy storage devices out of the plurality of energy storage devices; and
   a bus bar flame including a pressing portion that is brought into contact with the bus bar from a side opposite to the plurality of energy storage devices,
   wherein the bus bar frame includes a restriction portion with which a spacer other than the bus bar frame is engaged such that a movement of the bus bar frame in a perpendicular direction to the arrangement direction of the plurality of energy storage devices is restricted,
   wherein the spacer is arranged adjacently to the energy storage devices, and
   wherein the spacer is not directly in contact with the bus bar.

2. The energy storage apparatus according to claim 1, wherein the restriction portion includes:
   a first restriction portion whose movement is restricted by the spacer, and
   a second restriction portion whose movement is restricted by the spacer or a member other than the bus bar frame, and
   wherein the first restriction portion and the second restriction portion are arranged in a second direction intersecting with the first direction, and are arranged on opposite sides with the bus bar sandwiched therebetween.

3. The energy storage apparatus according to claim 2, wherein the first restriction portion is positioned on an end of the energy storage devices in the second direction, and
   wherein the second restriction portion is positioned on a surface of the energy storage devices where the electrode terminals are arranged.

4. The energy storage apparatus according to claim 1, wherein the spacer is arranged between the two energy storage devices arranged adjacently to each other.

5. The energy storage apparatus according to claim 1, further comprising a restraining member which applies a restraining force in the first direction to the plurality of energy storage devices,
   wherein the restriction portion is configured such that the movement of the bus bar frame is restricted by being engaged with a first projecting portion of the spacer, and
   wherein the restraining member is configured such that the movement of the bus bar frame in the perpendicular direction with the first projecting portion sandwiched therebetween is restricted by being brought into contact with the first projecting portion.

6. The energy storage apparatus according to claim 5, wherein the spacer is arranged between the two energy storage devices arranged adjacently to each other, and includes the first projecting portion.

7. The energy storage apparatus according to claim 6, further comprising another spacer arranged adjacently to the spacer in a state where one energy storage device out of the at least two energy storage devices is sandwiched between the spacer and the another spacer,
wherein the another spacer includes a second projecting portion arranged at a position where the second projecting portion is arranged in a row with the first projecting portion of the spacer in the first direction and is engaged with the first projecting portion.

8. The energy storage apparatus according to claim 1, wherein, in the arrangement direction of the plurality of energy storage devices, the spacer is located at an end of the plurality of the energy storage devices.

9. The energy storage apparatus according to claim 1, wherein the bus bar frame is engaged with the spacer.

10. The energy storage apparatus according to claim 1, wherein, in the arrangement direction of the plurality of energy storage devices, the spacer is located between the at least two energy storage devices.

11. The energy storage apparatus according to claim 1, wherein the bus bar frame is located between the spacer and the bus bar.

12. The energy storage apparatus according to claim 1, wherein the perpendicular direction to the arrangement direction extends in a stacking direction of the bus bar and the bus bar frame over the electrode terminals.

13. The energy storage apparatus according to claim 1, wherein the spacer is in contact with the energy storage devices.

14. The energy storage apparatus according to claim 1, wherein the spacer is in a direct contact with the energy storage devices.

* * * * *